US012643835B2

(12) United States Patent
Claeys Bouuaert

(10) Patent No.: US 12,643,835 B2
(45) Date of Patent: Jun. 2, 2026

(54) COMPOSITION FOR COATING SUBSTRATES

(71) Applicant: TRADE CORPORATION INTERNATIONAL, S.A. UNIPERSONAL, Madrid (ES)

(72) Inventor: Pascale Claeys Bouuaert, Woluwé-Saint-Pierre (BE)

(73) Assignee: TRADE CORPORATION INTERNATIONAL, S.A. UNIPERSONAL, Madrid (ES)

( * ) Notice: Subject to any disclaimer, the term of this patent is extended or adjusted under 35 U.S.C. 154(b) by 1072 days.

(21) Appl. No.: 17/615,048

(22) PCT Filed: May 28, 2020

(86) PCT No.: PCT/EP2020/064843
§ 371 (c)(1),
(2) Date: Nov. 29, 2021

(87) PCT Pub. No.: WO2020/239911
PCT Pub. Date: Dec. 3, 2020

(65) Prior Publication Data
US 2022/0227679 A1     Jul. 21, 2022

(30) Foreign Application Priority Data

May 29, 2019    (BE) ................................. 2019/5354

(51) Int. Cl.
| | |
|---|---|
| *C05F 11/02* | (2006.01) |
| *C05G 5/12* | (2020.01) |
| *C05G 5/27* | (2020.01) |
| *C05G 5/30* | (2020.01) |

(52) U.S. Cl.
CPC ............... *C05F 11/02* (2013.01); *C05G 5/12* (2020.02); *C05G 5/27* (2020.02); *C05G 5/30* (2020.02)

(58) Field of Classification Search
CPC .... C05G 5/30; C05G 5/27; C05G 5/12; C05F 11/02; C05D 9/00
See application file for complete search history.

(56) References Cited

U.S. PATENT DOCUMENTS 3,640,696 A        2/1972  Goldmann
2002/0174697 A1*  11/2002  Reid ....................... C05B 17/00
                                                                         71/23

FOREIGN PATENT DOCUMENTS

| EP | 3469890 A1 | 4/2019 |
|---|---|---|
| RU | 2201416 C2 * | 3/2003 |
| SU | 840090 A1 * | 9/1979 |
| WO | WO 2018/169411 A1 | 9/2018 |
| WO | WO 2019/098854 A1 | 5/2019 |

OTHER PUBLICATIONS

Google Translate machine translation of Forostyan (SU-840090-A1).*
"Humic Acid vs. Fulvic Acid." Meyer, Andrea. Soil Solutions, LLC. (Year: 2016).*
"Fumed Silica," Astrra Chemicals, Astrrachemicals.com.*
Aerosil and Sipernat Silica, Technical Information, Evonik Industries (Year: 2018).*
"Fumed Silica," Astrra Chemicals, Astrrachemicals.com (Year: 2025).*
Google Translate machine translation of Forostyan (SU-840090-A1) (Year: 1979).*
International Search Report and Written Opinion mailed Jul. 29, 2020 for Application No. PCT/EP2020/064843, 13 pages.

* cited by examiner

*Primary Examiner* — Amber R Orlando
*Assistant Examiner* — Heather Elise Silva Rainbow
(74) *Attorney, Agent, or Firm* — Squire Patton Boggs (US) LLP

(57)                    ABSTRACT

The present invention provides an aqueous dispersion comprising (a) an active agent which is a humic substance and (b) fumed silica, wherein: the % by weight of the active agent with respect to the total weight of the dispersion is comprised from 1 to 50%; and the weight ratio between the active agent and the fumed silica is comprised from 1.5:1 to 75:1, particularly from 1.5:1 to 60:1.
The invention also provides a process for its preparation as well its use as in coating a substrate, and the resulting coated substrate.
The dispersion of the invention allows increasing the amount of humic substances without negatively affecting the stability of the granule (in terms of dust and caking).

10 Claims, No Drawings

COMPOSITION FOR COATING SUBSTRATES

CROSS-REFERENCE

The present application is a 35 USC 371 national phase filing of PCT/EP2020/064843 filed on May 28, 2020, which claims the benefit of and priority to Belgian Patent Application 2019/5354 filed on May 29, 2019, both applications are incorporated herein by reference in their entirety.

This application claims the benefit of Belgian Patent Application 2019/5354 filed May 29, 2019.

TECHNICAL FIELD

The invention is generally related to the field of formulation and use of fertilizer compositions for agricultural use. In particular, the present invention relates to a high loaded stable aqueous dispersion comprising (a) an active agent which is a humic substance and (b) fumed silica, as well as to a process for its preparation, to its use as coating, to a process for coating a substrate and to the resulting coated substrate, such as a coated fertilizer or seed.

BACKGROUND ART

Modern agriculture has been toward high-yield, high quality, efficient, pollution-free direction. Development of new fertilizers is one of the conditions essential to the development of modern agriculture. As a new type of fertilizer humic substance is a natural organic substance which is an important component of humus, the major organic fraction of soil, peat, and coal (and also a constituent of many upland streams, dystrophic lakes, and ocean water).

A typical humic substance is a mixture of many molecules, some of which are based on a motif of aromatic nuclei with phenolic and carboxylic substituents, linked together; the illustration shows a typical structure. The functional groups that contribute most to surface charge and reactivity of humic substances are phenolic and carboxylic groups. Humic acids behave as mixtures of dibasic acids, with a pKa value around 4 for protonation of carboxyl groups and around 8 for protonation of phenolate groups. The other important characteristic is charge density. The molecules may form a supramolecular structure held together by non-covalent forces, such as van der Waals force, $\pi$-$\pi$, and CH-$\pi$ bonds. The presence of carboxylate and phenolate groups gives the humic acids the ability to form complexes with ions such as $Mg^{2+}$, $Ca^{2+}$, $Fe^{2+}$, and $Fe^{3+}$. Many humic acids have two or more of these groups arranged so as to enable the formation of chelate complexes. The formation of (chelate) complexes is an important aspect of the biological role of humic acids in regulating bioavailability of metal ions.

Due to the special properties of humic substances, efforts have been focussed on their use to enrich fertilizer granules by coating. In this coating process the humic substance is dissolved in a liquid vehicle. The main drawbacks have been identified using this technology. One of them is the deterioration of the granule due to the use of a liquid vehicle in case high quantities of liquid are added. The other one is that a high load of humic substance is required to achieve the desirable agronomical effect.

Therefore, there is the need of providing a humic substance-based formulation which overcomes the above limitations.

SUMMARY OF INVENTION

The present inventors have found that fumed silica can stably disperse a high load of humic substance.

As it is illustrated below, when a commercially available hydrophobic fumed silica dispersion was used, it was found that more than 20% wt of humic substance was successfully dispersed with respect to the total weight of the dispersion. In particular, Table 1 reports about 22.1% and Table 2 about 34-36%.

Table 2 also illustrates that this high loading technical effect is not restricted to a particular hydrophobic fumed silica nor to the fact that the starting fumed silica is used as a liquid or as a solid: the results of high loading were substantially the same using the same fumed silica source, one in the form of a dispersion and the other in the form of powder.

The inventors have also found that the coating could efficiently be performed on fertilizer granule, thus providing a homogeneous distribution of the coating ingredients over the whole fertilizer, while keeping intact the granule.

Thus, the present invention provides in a first aspect of the invention an aqueous dispersion comprising (a) an active agent which is a humic substance and (b) fumed silica, wherein:

the % by weight of the active agent with respect to the total weight of the dispersion is comprised from 1 to 50%; and the weight ratio between the active agent and the fumed silica is comprised from 1.5:1 to 75:1, particularly from 1.5:1 to 60:1.

Commercially available humic substance concentrated solutions comprise up about 15% in humic substance. Thus, the present invention, based on the use of a fumed silica-based dispersion, can provide humic substance dispersions with a higher load (at least about 50% higher) than those already available. This remarkable increase in humic charge is surprisingly achieved using an excess of the humic substance vs the amount of fumed silica dispersed in the composition of the invention.

As it is also shown below, the high loaded humic compositions of the invention are stable (in spite of the high load of humic substances in the coating), homogeneous and dryable.

In addition to the above, it was also found that the dispersions of the invention can be easily and efficiently used in the coating of fertilizer granules, without negatively affecting fertilizer's physico-chemical properties. As it is shown below, no caking and no significant dust were reported when the granules were coated with the dispersion of the invention.

Therefore, the invention means a great advance in the field of agrochemicals.

In a second aspect the present invention provides a process for preparing an aqueous dispersion as defined in the first aspect of the invention, which comprises the step of mixing the fumed silica with the active agent.

In a third aspect the present invention provides the use of an aqueous dispersion as defined in the first aspect of the invention for coating a substrate.

In a fourth aspect the present invention provides the use of an aqueous dispersion as defined in the first aspect of the invention as plant growth stimulant.

In a fifth aspect the present invention provides a process for coating a substrate selected from fertilizer granule and seed, the process comprising applying the aqueous dispersion as defined in the first aspect of the invention on the substrate's surface.

Finally, in a sixth aspect the present invention provides a coated fertilizer granule or seed obtainable by the process as defined in the fourth aspect of the invention.

DETAILED DESCRIPTION OF THE INVENTION

All the terms as used herein in this application, unless otherwise stated, shall be understood in their ordinary meaning as known in the art. Other more specific definitions for certain terms as used in the present application are as set forth below and are intended to apply uniformly through-out the specification and claims unless an otherwise expressly set out definition provides a broader definition. In addition, for the purposes of the present invention, any ranges given include both the lower and the upper end-points of the range. Ranges given, such as temperatures, times, weights, and the like, should be considered approximate, unless specifically stated.

In a first aspect the present invention provides an aqueous dispersion comprising a humic substance and a fumed silica.

In the present invention, the term "dispersion" has to be understood as a system in which discrete particles of fumed silica are dispersed in a continuous phase of another material (i.e., a polar solvent, such as water).

In the present invention, the term "humic substance" (HS) has to be understood as an organic complex comprising important components of humus, the major organic fraction of soil, peat, and coal (and also a constituent of many upland streams, dystrophic lakes, and ocean water). Humic substances are involved in many processes in soils and natural waters: e.g. soil weathering, plant nutrition, pH buffering, trace metal mobility and toxicity, bioavailability, degradation and transport of hydrophobic organic chemicals, formation of disinfection by-products during water treatment, and heterotrophic production in blackwater ecosystems. Accordingly, humic substances have received attention from scientists in a wide variety of disciplines.

According to the information provided in the International Humic Substances Society (IHSS), humic substances in soils and sediments can be divided into three main fractions: humic acids (HA or HAs), fulvic acids (FA or FAs) and humin. The HA and FA are extracted from soil and other solid phase sources using a strong base (NaOH or KOH). Humic acids are insoluble at low pH, and they precipitate by adding strong acid (adjust to pH 1 with HCl). Humin cannot be extracted with either a strong base or a strong acid. Aquatic HS contain only HA and FA. The first ones are generally removed from water by lowering the pH to 1 and decanting them. After that, the remaining extract is passed through a hydrophobic resin that retains the fulvic acids but elute possible adulterants. Afterwards, they are extracted from the resin with an alkaline solution. The resin column separation is used to separate FA from the non-humic materials (amino acids, peptides, sugars, etc.) extracted from soils. At low pH the FA adsorbs on the resin, but non-humic materials pass through the column.

In one embodiment of the first aspect of the invention, optionally in combination with any of the embodiments provided above or below, the humic substance comprises humic acid, or, alternatively, fulvic acid or, alternatively, a combination of humic and fulvic acids. In another embodiment of the first aspect of the invention, optionally in combination with any of the embodiments provided above or below, the humic substance comprises humic acid at a percentage by weight with respect to the total weight of the humic substance in the range comprised from 5-90%, preferably from 25 to 85%, more preferably from 80-83%, more preferably 82%, and fulvic acid is in a percentage by weight with respect to the total weight of the humic substance in the range comprised from 10-95%, being the sum of both ingredients 100% by weight. In another embodiment of the first aspect of the invention, optionally in combination with any of the embodiments provided above or below, the humic substance comprises humic acid at a percentage by weight with respect to the total weight of the humic substance in the range comprised from 10-30%, and fulvic acid is in a percentage by weight with respect to the total weight of the humic substance in the range comprised from 70-90%, being the sum of the ingredients 100% by weight. In another embodiment of the first aspect of the invention, optionally in combination with any of the embodiments provided above or below, the humic substance comprises humic acid at a percentage by weight with respect to the total weight of the humic substance in the range comprised from 5-90%, from 10 to 90%, from 25 to 85%, from 80-83%. In another embodiment of the first aspect of the invention, optionally in combination with any of the embodiments provided above or below, the humic substance comprises humic acid at a percentage by weight with respect to the total weight of the humic substance of about 82%. In another embodiment of the first aspect of the invention, optionally in combination with any of the embodiments provided above or below, the humic substance comprises fulvic acid at a percentage by weight with respect to the total weight of humic substance in the range comprised from 10-95% or from 70-90%.

In the present invention the term "fumed silica" (CAS number 112945-52-5) can also be referred as pyrogenic silica because it is produced in a flame, and it refers to microscopic droplets of amorphous silica fused into branched, chainlike, three-dimensional secondary particles which then agglomerate into tertiary particles. The resulting powder has an extremely low bulk density and high surface area. Its three-dimensional structure results in viscosity-increasing, thixotropic behaviour when used as a thickener or reinforcing filler.

In one embodiment of the first aspect of the invention, optionally in combination with any of the embodiments provided above or below, the fumed silica is a hydrophobic fumed silica.

In the present invention the term "hydrophobic fumed silica" means a fumed silica that repels a mass of water and it is characterized by bearing hydrophobic groups chemically bonded to the surface. The hydrophobic groups are normally alkyl or polydimethylsiloxane chains, hexamethyldisilazane, dimethyldichlorosilane, and polydimethylsiloxane and combinations thereof. Many manufacturers provide hydrophobic fumed silicas, such as Evonik (Aerodisp™) or Cabot, Corp (Cab-O-Sperse™).

In another embodiment of the first aspect of the invention, optionally in combination with any of the embodiments provided above or below, the % by weight of the active agent with respect to the total weight of the dispersion is comprised from 10-50% by weight, from 10-40% by weight, from 15-50% by weight, from 20-50% by weight, or from 19 to 40% by weight. In one embodiment of the first aspect of the invention, optionally in combination with any of the embodiments provided above or below, the % by weight of the active agent with respect to the total weight of the dispersion is 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49% or 50% by weight.

In another embodiment of the first aspect of the invention, optionally in combination with any of the embodiments provided above or below, the weight ratio between the active agent and the fumed silica is comprised from 2:1 to 70:1, 2:1 to 55:1, preferably from 10:1 to 65:1, preferably from 15:1 to 60, from 20:1 to 45:1, or from 30:1 to 40:1. In another embodiment of the first aspect of the invention, optionally in combination with any of the embodiments provided above or below, the weight ratio between the active agent and the fumed silica is 10:1, 11:1, 12:1, 13:1, 14:1, 15:1., 16:1, 17:1, 18:1, 19:1, 20:1, 21:1, 22:1, 23:1, 24:1, 25:1, 26:1, 27:1, 28:1, 29:1, 30:1, 31:1, 32:1, 33:1, 34:1, 35:1, 36:1, 37:1, 38:1, 39:1, 40:1, 41:1, 42:1, 43:1, 44:1, 45:1, 46:1, 47:1, 48:1, 49:1, 50:1, 51:1, 52:1, 53:1, 54:1, 55:1, 56:1, 57:1, 58:1, 59:1, 60:1, 61:1, 62:1, 63:1, 64:1, 65:1, 66:1, 67:1, 68:1, 69:1, 70:1, 71:1, 72:1, 73:1, 74:1 or 75:1.

In another embodiment of the first aspect of the invention, optionally in combination with any of the embodiments provided above or below, the % by weight of the active agent with respect to the total weight of the dispersion is from 10-50%, and the weight ratio between the active agent and the fumed silica is comprised from 2:1 to 70:1, from 10:1 to 65:1, or from 15:1 to 60:1.

In another embodiment of the first aspect of the invention, optionally in combination with any of the embodiments provided above or below, the % by weight of the active agent with respect to the total weight of the dispersion is from 10-40%, and the weight ratio between the active agent and the fumed silica is comprised from 2:1 to 70:1, from 10:1 to 65:1, or from 15:1 to 60:1.

In another embodiment of the first aspect of the invention, optionally in combination with any of the embodiments provided above or below, the aqueous dispersion further comprises one or more agriculturally acceptable agents.

In the present invention, the term "agriculturally acceptable agent" comprises chelates, macronutrients, micronutrients, amino acids, plant hormones, plant extracts, crop protectants, biopolymers and micro-organisms, among others.

The term "agriculturally acceptable" applied to a material or composition herein means not unacceptably damaging or toxic to a plant or its environment, and not unsafe to the user or others that may be exposed to the material when used as described herein.

Illustrative non-limitative examples of chelates and chelating agents are ethylene diamine-tetra-acetic acid (EDTA), diethylene-triamine penta-acetic acid (DTPA), and ethylenediamine-N,N'-bis(2-hydroxyphenylacetic acid) (EDDHA).

Illustrative non-limitative examples of plant protection products are insecticides, fungicides, nematicides.

Illustrative non-limitative examples of macronutrients are Nitrogen, Potassium, Calcium, Magnesium, Phosphorus and Sulphur.

Illustrative non-limitative examples of micronutrients are Boron, Zinc, Copper, Manganese, Iron, and Molybdenum.

Illustrative non-limitative examples of amino acids are glutamate, glutamine, aspartate and derived amino acids.

Illustrative non-limitative examples of plant hormones are auxin, gibberellin, cytokinin, ethylene and abscisic acid.

Illustrative non-limitative examples of plant extracts are seaweed, algae, essential oils, and neem.

Illustrative non-limitative examples of biopolymers are chitosan, proteins, peptides, carrageenan, cellulose, starch, polyvinylpyrolidone, alkylated polyvinylpyrolidone, polyvinylacetates, polyvinylacetate coploymers, polyvinylalcolhol, polyethyleneglycol, polypropylenegylcol, polyacrylates, styrene butadiene, polyurethane, carnauba wax, paraffin wax, bees wax, polyethylene wax, polypropylene wax, methylCelloses, and ethylcelluloses.

Illustrative non-limitative examples of microorganisms are bacteria (e.g. *Rhizobium, Bacillus, Pseudomonas*), and fungi (e.g. *Aspergillus, Trichoderma, Penicillium*).

All the embodiments provided under the first aspect of the invention, concerning the fumed silica, active agent, percentages by weight, ratios and the possible inclusion of other agriculturally acceptable agents, are also embodiments of the other aspects provided in the present application.

In a second aspect the present invention provides a process for preparing an aqueous dispersion as defined in the first aspect of the invention.

In one embodiment of the second aspect of the invention, optionally in combination with any of the embodiments provided above, the fumed silica, which is mixed with the humic substance, is in liquid form. In an alternative embodiment of the second aspect of the invention, optionally in combination with any of the embodiments provided above, the fumed silica is in the form of powder and then it is mixed with the humic substance (also in powder form) prior preparing the water dispersion.

In a third aspect the present invention provides the use of an aqueous dispersion as defined in the first aspect of the invention for coating a substrate.

In the present invention, the term "substrate" encompasses inert carriers (such as limestone), fertilizer granules, and parts of the plant, such as seeds, rhizomes, cuttings or buds.

In one embodiment of the third aspect of the invention, optionally in combination with any of the embodiments provided above or below, the substrate is a fertilizer granule, an inert carrier or seed.

In the present invention the term "fertilizer granule" means a particle or agglomeration of particles that include nutrients to enhance plant growth. For purposes of this invention, fertilizer prill and granule can be used synonymously as the differences between the two are only related to the size of the particle or agglomeration of particles.

A fertilizer granule is a material of natural or synthetic origin that is employed to distribute the essential nutrients to plants and crops. Any granule containing nutrients and capable of accepting a coating is suitable for the purposes of this invention. The granule in certain embodiments may include one or more of the primary nutrients and the nutrients may come from one or more fertilizer sources such as urea and muriate of potash. Thus, the fertilizer granules can comprise nitrogen, phosphorus, or potassium sources such as ammonium nitrate, ammonium sulphate, ammonium sulphate nitrate, calcium nitrate, calcium ammonium nitrate ("CAN"), urea, urea-formaldehyde, monoammonium phosphate ("MAP"), diammonium phosphate ("DAP"), polyphosphate compounds, phosphate rock, single superphosphate ("SSP"), triple super phosphate, potassium nitrate, potassium chloride, or potassium sulphate ("SOP" or potash). Combinations comprising the foregoing may also be used. In certain embodiments, the granule materials are generally uniform in size and are readily handled to facilitate the coating process of this disclosure. The granules generally are also water-soluble to enable release and dissolution into the soil and allow for timely plant root uptake. The dispersion of the invention can be applied to any of the fertilizer granules commercially available.

In a fifth aspect the present invention provides a process for coating a substrate selected from fertilizer granule and seed, the process comprising applying the aqueous dispersion as defined in the first aspect of the invention on substrate's surface.

The blending of the to-be-coated-substrate may be conducted in any conventional blending equipment (for instance using a batch or continuous blender) that is suitable for handling the liquid and dry components. Additionally, the blending operation may be customized or take place near the point-of-application in order to fully adjust to the varying nutrient demands of different soils.

The coated fertilizer/seed can be manufactured by various methods. The fertilizer granules can be coated by spray coating (for example, top, bottom, or side spray coating), drum coating, pan coating, fluid bed coating, continuous pour coating, or any other method known to those of skill in the art. This coating can be done in a batch or in a continuous process. The granules can be coated with a single layer in a single coating application, or the granules can be coated with multiple layers of the same coating material, such as, 2, 3, 4, 5, or more layers or, alternatively, of a different material. Thus, the granule or seed of the invention can include a single coating of the dispersion of the invention in direct contact with the granule/seed surface or, alternatively, in contact with an intermediate coating made of one or more extra-ingredients (such as humic acid or excipients.

After application of the liquid coating material to the core, the coated core is allowed to cool and/or dry so that the coating material solidifies forming a solid layer surrounding the core. This process may be repeated one or more times to produce multiple layers of the same or different coating materials surrounding the core. Alternatively, the coating material can be dissolved or suspended in a solvent, applied to the granules, and the solvent evaporated. This process may be repeated one or more times to produce multiple layers of the same or different coating materials surrounding the core. Alternatively, the coating can be applied to a fertilizer or seed already comprising a coating made with extra-ingredient(s) in powder form (such as humic acid (in addition to the one already included in the dispersion), excipients, etc).

In one embodiment, optionally in combination with any of the embodiments provided above or below, the fertilizer's granule or seed comprises a single coating of the dispersion of the invention. In another embodiment, optionally in combination with any of the embodiments provided above or below, the fertilizer's granule or seed comprises a single coating of the dispersion of the invention and it is obtained by continuous pouring the dispersion of the invention on fertilizer's surface (either in a batch or in a continuous process). In this embodiment, the starting fertilizer's surface (i.e., prior to the dispersion coating) may be already coated with one or more extra-ingredients in powder form.

The resulting coated fertilizer granule or seed can be later coated with one or more layers comprising other ingredients or with the dispersion of the invention. This further one or more layer(s) can be applied either in the form of liquid or of a powder.

In one embodiment of the fifth aspect of the invention, the process comprises applying the liquid dispersion of the invention and, then, applying a powder of the extra-ingredient(s) of interest to the resulting liquid coating. Alternatively, the process comprises applying the powder of the extra-ingredient(s) and then, the resulting powder coating is coated with the dispersion of the invention.

Depending on the coating technique finally selected, the adjustment of the viscosity of the aqueous dispersion of the invention prior to its application can be required. The skilled person can routinely perform this task with no effort. In one embodiment of the process of the fifth aspect of the invention, optionally in combination with any of the embodiments provided above or below, the adjustment of the viscosity is performed by adding water; or, alternatively, by adding an aqueous solution comprising one or more agriculturally acceptable agents as defined above.

In one embodiment of the fifth aspect of the present invention, optionally in combination with any of the embodiments provided above or below, the aqueous dispersion is applied on substrate's surface by dripping or spraying.

In another embodiment of the fifth aspect of the present invention, optionally in combination with any of the embodiments provided above or below, the aqueous dispersion is applied on a portion of the substrate's surface. Alternatively, in another embodiment of the fifth aspect of the present invention, optionally in combination with any of the embodiments provided above or below, the aqueous dispersion is applied on the whole substrate surface.

There is no major restriction in the coating step other than the surface can only be wetted up to the level of conglomeration. If the process comprises the subsequent addition of powder, it can be added up to the level of complete saturation of the wetted surface (more powder will not be absorbed).

In another embodiment of the fifth aspect of the present invention, optionally in combination with any of the embodiments provided above or below, after the application of the dispersion, one or both of the following steps is performed: (a) addition of humic substance powder and/or of one or more excipients selected from: a drying agent (such as dessicant), an anticaking agent, a lubricant agent, an anti-adherent agent, a glidant agent or a combination thereof, or of one or more plant trace elements, or of a combination thereof; and (b) dry the impregnated substrate. In another embodiment of the fifth aspect of the present invention, optionally in combination with any of the embodiments provided above or below, after the application of the dispersion, the process further comprises (i) addition of humic substance powder, and (ii) addition of one or more excipients. In another embodiment of the fifth aspect of the present invention, optionally in combination with any of the embodiments provided above or below, after the application of the dispersion, the process further comprises (i) addition of humic substance powder, and (ii) addition of one or more drying agent. In another embodiment of the fifth aspect of the present invention, optionally in combination with any of the embodiments provided above or below, steps (i) and (ii), as defined herein, are performed one or several times.

Illustrative non-limitative examples of drying agents are diatomaceous earth, zeolites, anhydrous sodium sulphate, anhydrous calcium sulphate, biochar or activated carbon, and clay or mixtures thereof.

Illustrative non-limitative examples of excipients are stearic acid or its salts (such as sodium, calcium, magnesium, and potassium stearate), sodium oleate, sodium benzoate, sodium chloride, sodium stearyl fumarate, magnesium lauryl sulfate, sodium stearyl fumarate, sucrose esters or fatty acid, zinc, polyethylene glycol, talc and mixtures thereof, and colloidal silicon dioxide.

The drying step can be performed by any of the routine techniques well-known to those skilled in the art.

In a sixth aspect the present invention provides a coated fertilizer obtainable by the process as defined in the fifth aspect of the invention.

In one embodiment of the fifth aspect of the invention the coating has the active agent in a percentage by weight comprised from 0.005 to 3.5%, with respect to the total weight of the coated granule, preferably from 0.01 to 1.5%.

In one embodiment of the fifth aspect of the invention the coating has the active agent in a percentage by weight comprised from 0.05 to 3.5%, with respect to the total weight of the coated granule, preferably from 0.05 to 1.5%.

Throughout the description and claims the word "comprise" and variations of the word, are not intended to exclude other technical features, additives, components, or steps. Furthermore, the word "comprise" encompasses the case of "consisting of". Additional objects, advantages and features of the invention will become apparent to those skilled in the art upon examination of the description or may be learned by practice of the invention. The following examples are provided by way of illustration, and they are not intended to be limiting of the present invention. Furthermore, the present invention covers all possible combinations of particular and preferred embodiments described herein.

EXAMPLES

Screening started with a hydrophilic and a hydrophobic fumed silica. When used as powder, the fumed silica needs very high shear to be dispersed into a solution. Readily dispersed fumed silica in water does exist, which render the incorporation of the fumed silica into a liquid easier. This option has been chosen for screening purpose.

Trial 1

In this trial the ability of a hydrophobic fumed silica dispersion (Aerodisp WR8520, EVONIK) in incorporating solid Humifirst® WG (Tradecorp) was tested. To that end, water and fumed silica were firstly mixed and then the humic powder was added portion wise, until no further powder could be incorporated (i.e., a very high viscous, almost solid mass was obtained).

Table 1 below provides the achievable concentration of humic substances when using fumed silica compared to the commercially available humic solution without fumed silica

Impact of fumed silica on achievable humics concentration

| | % active substances in raw material | Commercial Humifirst liquid (for comparative purposes) | PCB078-1 (dispersion of the invention) |
|---|---|---|---|
| Water, g | | | 100 g |
| Aerodisp WR8520, FS dispersion, g | 20% FS | none | 10 g |
| Humifirst WG (powder), g | 65% Humic substances | | 145 g |
| % Humic powder | | | 56% |
| % Humic substances (HS) | | 15% | 36.4% |
| % active Fumed silica (FS) (=20% of dispersion) | | — | 0.8% |
| FS:HS | | — | 2.15:100 |
| Coating aspect | | 30 μ wet film on flat substrate: Glass Leneta2A Leneta N2A2 | Translucid and touch dry |

To have a first estimate of the coating quality, the dispersion was applied onto a flat substrate by draw down, using a bloc coater which leaves a 30 μm wet film. To have a variety of surface characteristics like is the case with fertilizer granules, following flat substrates were selected: glass (float clair), Leneta sheet 2A and Leneta sheet N2A2. Each Leneta sheet was divided in a white and a black part. This made 5 substrates, with different surface characteristics in terms of surface tension or roughness. The target at this stage was to verify the film formation on various substrate characteristics and whether the liquid coating solution physically dried. The drying was followed by fingerprint. The appearance of the dry film was visually observed, although esthetics is not a critical parameter for a fertilizer coating. This solution was spry applied onto fertilizer granules (Urea 46 and CAN 27 were selected) into a small rotative blender. By post adding mica drying powder to the wet granules, the resulting fertilizer surface was physically dry and looked homogeneously covered by the humics coating. After a few weeks storage at room conditions in a sealed bag, no caking was observed.

In addition to achieving a solution able to give a coating on Urea 46 and CAN 27 fertilizers, an unexpected increase in humics concentration when compared with the commercially humic solution Humifirst® was observed with the hydrophobic fumed silica dispersion. In fact, it was found that the humic concentration was more than double the level of the commercially available liquid Humifirst® which contains 15% humic substances.

This surprising increase in the humic concentration is achieved just adding a minor amount of fumed silica (about 0.8% by weight).

Trial 2

The trial was performed with the hydrophobic fumed silica (FS) dispersion Aerodisp WR8520 and the hydrophobic fumed silica (FS) powder Aerosil R972:

TABLE 2

| | % active substances in raw material | Hydrophobic FS dispersion Aerodisp WR8520 | Hydrophobic FS powder Aerosil R972 |
|---|---|---|---|
| Water, g | | 100 | 100 |
| FS dispersion, g | 20% FS | 10 | |
| FS powder, g | 100% FS | | 2 |
| Humifirst WG (powder), g | 65% HS | 74 | 68 |
| % Humic substances (HS) | | 26% | 26% |
| % active fumed silica (FS) | | 1.1% | 1.2% |
| FS:HS | | 4.2:100 | 4.6:100 |
| Coating aspect | 30 μ wet film on flat substrate | translucid Touch dry film on Glass Leneta2A Leneta N2A2 | translucid Touch dry film on Glass Leneta2A Leneta N2A2 |

As above, it could be concluded that fumed silica, independently of whether it is originally in liquid or powder form, remarkably allows increasing the humic concentration when compared with the commercially available liquid Humifirst®, which contains 15% humic substances.

Trial 3

To verify the unexpected property of the fumed silica to increase humics concentration into a liquid solution, commonly advised dispersing and wetting agents for pigment concentrates as well as tap water were used as comparison.

To that end, the humic powder (Humifirst WG (HF WG, Tradecorp)) was added by portion in the undiluted adjuvant. The incorporation of the organic humic powder was carried out manually with a spatula. The experiment was discontinued when the solution became too viscous and not flowable, or, when extra powder was not absorbed anymore by the liquid.

TABLE 3

| Raw materials | | | |
|---|---|---|---|
| | Product family | Product name | Active ingredients, % wt |
| Adjuvants | Water | Tap water | |
| | Wetting agent | Additol VXW6208 | 50% polymeric non-ionic dispersant |
| | Fumed silica dispersion | Aerosil WR8520 | 20% FS |
| Humic powder | High Humic acid level | Humifirst WG | 65% humics (53% humic acid & 12% fulvic acid) |

TABLE 4

| Achievable powder/humics concentration in the pure adjuvant | | | |
|---|---|---|---|
| | | Humifirst WG | |
| | | % powder in the final solution | % humics into final solution |
| Adjuvant | Aerodisp WR8520 | 44.0% | 28.6% |
| | Additol 6208 | 32.0% | 20.8% |
| | Water | 24.2% | 15.8% |

Aerodisp WR8520 gave, when used as undiluted liquid compound, the possibility to reach 44% humic powder. This outperformed the other liquid substances.

For cost reasons and efficacy, a 10% by weight of the aqueous fumed silica (FS) dispersion was prepared. This diluted FS solution even allows to reach humics formulation with 36.4% Humic substances (see Table 2 above). However, it was found that the viscosity of the dispersion was above the pumpable capacity of the majority of available pumps at fertilizer blending companies.

To be used as a coating onto fertilizer, this high viscous solution needs to be diluted to a viscosity below 3600 cP. A pumpable solution was reached with a level of 40% of Humifirst WG powder. To keep level of humic substances as high as possible, a diluted version of PCB078_1 (Table 1 above) was done with liquid Humifirst (Tradecorp).

TABLE 5

| | active substances in raw material | PCB 154-1 |
|---|---|---|
| Water, g | | 36.4 |
| FS dispersion (Aerodisp WR8520), g | 20% FS | 3.6 |
| Liquid Humifirst ®, g | 15% Humic substances | 20 |
| Humic powder HF WG, g | 65% Humic substances | 40 |
| % Humic substances | | 29% |
| % active fumed silica | | 0.7% |
| Final solution | | <3600 cP |
| Coating aspect | 30 μ wet film on flat substrate | translucid, touch dry film on |

TABLE 5-continued

| | active substances in raw material | PCB 154-1 |
|---|---|---|
| | | Glass Leneta2A Leneta N2A2 |

Trial 4

The dispersion PCB151-4 (Table 5 above), containing 36% water, 3.6% fumed silica dispersion and 29% humic substances was used for coating granular fertilizer CAN27+4 (Origin Borealis). To that end, 400 g of fertilizer granules were added into a small rotative blender. The blender was set on 'rotation' mode and, very fast, alternate additions of 2.5 g of the dispersion and 4 g mica MU85F drying powder (Imerys) were added. The liquid was added by spray (aluminium Water Spray Bottle), the powder by pouring, whilst the blender was in motion. After about 1 minute, a total of 10 g humic dispersion and 16 g drying powder were added. The 400 g fertilizer granules, together with the 10 g liquid solution and the 16 g drying powder were allowed to mix in the rotating blender for one more minute. After a total process time of 2 minutes, the blender was stopped and the resulted fertilizer was collected in an open aluminum box.

It was visually concluded that the resulting coated fertilizer, enriched with 7.25 kg humic substances per ton fertilizer, showed a homogenous coating. At 15 minutes, this coated fertilizer was stored in plastic bags at room temperature. After 21 days, dust release and caking were determined.

Dust equal or below 1 μm, was determined using a RETSCH Test Sieve ISO 3310/1 200×50 mm 1.00 mm stainless steel with compliance certificate acc. EN 10204 2.1. It was found that there was a release of 0.8 g dust, which means a 0.18% of the total weight of the coated granule.

The stored fertilizer sample did not show any sign of caking. All granules showed free flowing behavior (checked during the sieving test above).

Therefore, it could be concluded that the coated granules of the invention, even carrying so high load of humic substances, were extremely stable.

The invention claimed is:

1. An agrochemical aqueous dispersion comprising (a) an active agent which is a humic substance and (b) a hydrophobic fumed silica, wherein the % by weight of the active agent with respect to the total weight of the dispersion is from 26% to 36.4%; and the weight ratio between the active agent and the hydrophobic fumed silica is from 21.7:1 to 46.5:1.

2. The agrochemical aqueous dispersion of claim 1, wherein the humic substance comprises humic acid, or alternatively, fulvic acid, or alternatively, a combination of humic and fulvic acids.

3. The agrochemical aqueous dispersion of claim 1, wherein the humic substance comprises humic acid at a percentage by weight with respect to the total weight of the humic substance in the range from 5-90%, and fulvic acid at a percentage by weight with respect to the total weight of the humic substance in the range from 10-95%, the sum of both ingredients being 100% by weight.

4. The agrochemical aqueous dispersion of claim 1, further comprising one or more biostimulant(s).

5. A process for preparing the agrochemical aqueous dispersion of claim 1, comprising mixing a hydrophobic fumed silica with an active agent which is a humic substance, wherein the % by weight of the active agent with respect to the total weight of the dispersion is from 26% to 36.4%; and the weight ratio between the active agent and the hydrophobic fumed silica is from 21.7:1 to 46.5:1.

6. A process for coating a substrate selected from fertilizer granule and seed, the process comprising applying the agrochemical aqueous dispersion of claim 1 on a surface of the substrate.

7. The process according to claim 6, wherein the agrochemical aqueous dispersion is applied on the substrate's surface by dripping or spraying.

8. A coated fertilizer granule or seed obtainable by the process of claim 6.

9. The coated fertilizer granule or seed of claim 8, wherein the percentage by weight of the active agent is from 0.01 to 3.5% with respect to the total weight of the coated granule or seed.

10. A method for stimulating the growth of a plant, the method comprising applying the aqueous dispersion of claim 1 to a substrate's surface.

\* \* \* \* \*